(12) United States Patent
Rhein et al.

(10) Patent No.: US 6,264,027 B1
(45) Date of Patent: Jul. 24, 2001

(54) MEDIA STORAGE CASE REPAIR KIT

(76) Inventors: Blake W. Rhein, 7746 Cliffview Dr., Poland, OH (US) 44514; Frances L. Deley, Jr., 635 Cathy Ann Dr., Boardman, OH (US) 44572

( * ) Notice: Subject to any disclaimer, the term of this patent is extended or adjusted under 35 U.S.C. 154(b) by 0 days.

(21) Appl. No.: 09/468,506

(22) Filed: Dec. 21, 1999

(51) Int. Cl.[7] .............................. B65D 69/00; B65D 85/57
(52) U.S. Cl. ........................................ 206/308.1; 206/582
(58) Field of Search ........................... 206/308.1, 308.2, 206/308.3, 312, 582

(56) References Cited

U.S. PATENT DOCUMENTS

| | | |
|---|---|---|
| 4,750,611 | 6/1988 | Morrone . |
| 4,793,480 * | 12/1988 | Gelardi et al. ................... 206/312 |
| 4,892,189 * | 1/1990 | Kunimune et al. ........... 206/308.1 X |
| 4,998,985 | 3/1991 | Sankey . |
| 5,493,764 | 2/1996 | Coppola . |
| 5,495,940 | 3/1996 | Taniyama . |
| 5,513,749 * | 5/1996 | Simmons ......................... 206/308.1 |
| 5,720,384 * | 2/1998 | Wu-Chen ........................ 206/308.1 |

* cited by examiner

*Primary Examiner*—Bryon P. Gehman
(74) *Attorney, Agent, or Firm*—Sand & Sebolt

(57) ABSTRACT

A repair kit for a media storage case includes a pair of repair tabs that each include top and side attachment plates, an abutment plate, a replacement pin, and an adhesive strip. The repair tabs are attachable onto the lid of a media storage case to replace the function of one or both ears that have broken away from the lid of the media storage case. The adhesive strip provided on each repair tab adheres the repair tab to the lid. The replacement pins of the repair tabs restore pivotable movement of the lid with respect to the base. The abutment plates retain the replacement pins in pivotable engagement with corresponding holes formed in the base.

24 Claims, 6 Drawing Sheets

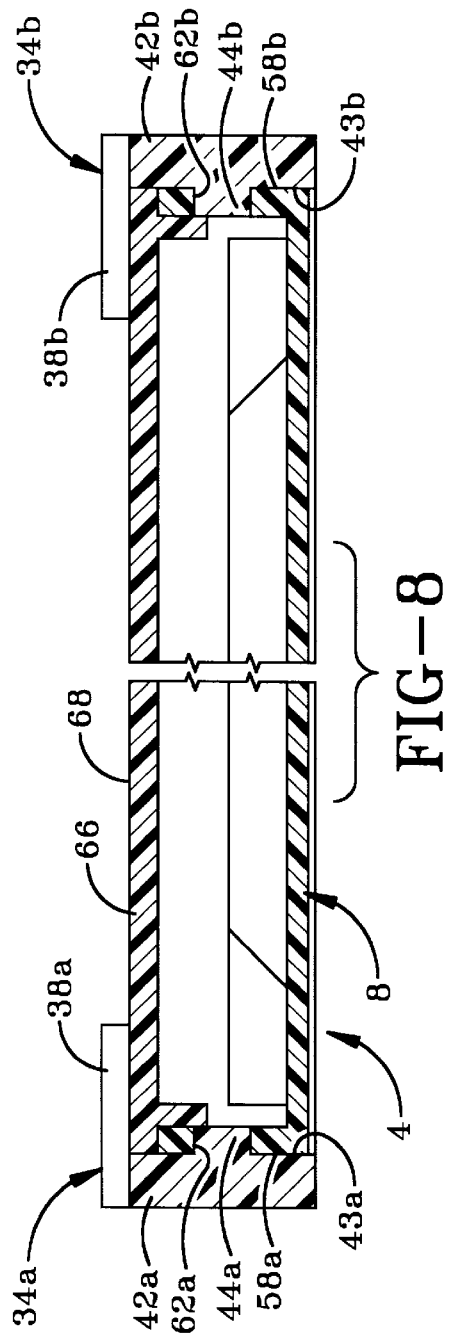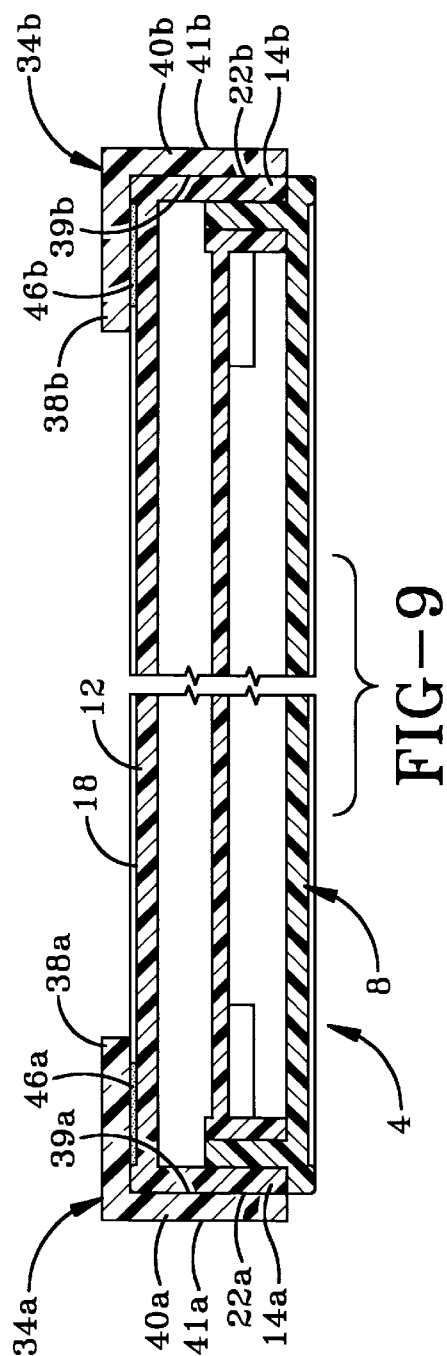

MEDIA STORAGE CASE REPAIR KIT

BACKGROUND OF THE INVENTION

1. Technical Field

The invention relates generally to storage cases for recorded media and, more particularly, to a repair kit for repairing a broken storage case for recorded media. Specifically, the invention relates to a repair kit for a recorded media case having a lid and a base, the lid having a pair of ears that pivotably attach the lid onto the base, the repair kit having a pair of repair tabs, each repair tab being adherable to the lid to take the place of an ear that has been broken away from the lid.

2. Background Information

As is known and understood in the relevant art, recorded media such as videocassettes, audio cassettes, compact discs, digital video discs (DVD), as well as other recorded media, are stored in appropriately sized cases. Compact discs and DVDs are often stored in media storage cases known as a "jewel cases". Such media storage cases include a base and a lid, the lid having a pair of parallel and spaced apart ears that extend outwardly therefrom. Each ear includes a pin protruding outwardly therefrom that is axially aligned with the pin protruding from the other ear. The pins are pivotably received in correspondingly sized and axially aligned holes formed in the base at one end thereof.

When the pins are pivotably received in the holes, the ears and thus the lid are pivotably mounted on the base. While such media storage cases or "jewel cases" are effective for their intended purposes, such media storage cases have not been without limitation.

One prevalent problem with the "jewel case" is the tendency for the ears to become broken away from the lid. Such breakage can occur in any of a variety of ways such as by dropping, rough handling, etc. The loss of one or both of the ears concomitantly results in the loss of one or both of the pins, respectively, from the lid, which thus inhibits the ability of the lid to remain pivotably mounted on the base.

More specifically, the ears of the "jewel case" perform a multi-directional retention function to restrict movement of the lid to one degree of freedom with respect to the base. As is understood in the relevant art, the ears each include a substantially planar inner surface from which the pin protrudes. The inner surfaces are substantially parallel and spaced apart from one another, and the pins (as indicated hereinbefore) are axially disposed. The base is formed with a pair of parallel and spaced apart side surfaces into which the holes are formed, the holes likewise being axially disposed.

When the pins are pivotably received in the holes, the lid is pivotably mounted on the pins and thus can pivot with respect to the base. Additionally, the inner surfaces of the ears are slidingly disposed substantially flush with the side surfaces of the base. As such, the flush configuration of the inner surfaces of the ears with the side surfaces of the base prevents the lid from moving along a common imaginary axis extending through the pins with respect to the base. It can be seen, therefore, that the loss of one of the ears not only results in the loss of the pin extending from that ear but also permits the lid to move axially with respect to the base along the imaginary axis extending through the remaining pin. Such axial movement can result in the remaining pin becoming disengaged from its hole and causing the lid to become completely detached from the base. The loss of one or both ears from the lid of a "jewel case" thus substantially inhibits the functioning of the lid with respect to the base.

The lid of the media storage case is important to the function of the storage case for a number of reasons. For instance, the lid covers the base and the recorded media disposed therein, thus inhibiting the collection of dust on the recorded media. Additionally, the lid being disposed over the recorded media protects the recorded media from damage. Furthermore, the lid of a "jewel case" often carries a liner that is associated with the specific recorded media included in the "jewel case" and typically includes lyrics, credits, and other programming notes that the user often wishes to remain in close association with the specific recorded media. As such, the detachment of the lid from the base substantially impairs the function of the "jewel case". It is thus preferred to provide a repair kit that can restore a lid of a media storage case to its proper level of function despite the loss of one or both ears from the lid.

Such a repair kit preferably will allow the user to restore the function of the lid depending upon whether one or both of the ears of the lid have been lost. Additionally, such a repair kit preferably will only minimally increase the outer dimensions of the "jewel case".

SUMMARY OF THE INVENTION

In view of the foregoing, an objective of the present invention is to provide a repair kit for restoring the function of a broken media storage case.

Another objective of the present invention is to provide a repair kit that takes the place of one or both ears that have been broken away from the lid of a media storage case.

Another objective of the present invention is to provide a repair kit for a media storage case wherein the repair kit includes a pair of repair tabs.

Another objective of the present invention is to provide a repair kit having a pair of repair tabs that each include a replacement pin.

Another objective of the present invention is to provide a repair kit wherein the repair tabs each provide an abutment plate.

Another objective of the present invention is to provide a repair kit wherein the repair tabs each include at least a first adhesive strip or compound to facilitate attachment of the tab onto the lid of a media storage case.

Another objective of the present invention is to provide a repair kit wherein the abutment plates provided by the repair tabs are substantially coplanar with the inner surfaces of the ears before the ears had been broken away from the lid.

Another objective of the present invention is to provide a repair kit wherein the replacement pins protruding from the repair tabs are alignable with the positions occupied by the pins before the ears were broken away from the lid.

These and other objectives are obtained from the repair tab of the present invention for replacing an ear of a media storage case, the general nature of which can be stated as including a first attachment plate and a replacement pin, the replacement pin extending in a direction substantially perpendicular to the first attachment plate.

Other objectives and advantages are obtained from the method of the present invention for repairing a broken media storage case, the media storage case initially including a base and a lid, the lid being pivotally mounted on the base, the base having a pair of side surfaces, the side surfaces each being formed with a hole, the lid having a top member, a pair of side members, and a pair of ears, the top member having a top surface, the side members extending substantially perpendicularly from the top member, the side members each having an inner surface and an outer surface, the ears extending from the side members, each ear having an inner surface that is substantially coplanar with the inner surface of the side member from which it extends, each ear including a pin protruding from the inner surface of the ear, the pin being pivotably received in one of the holes formed in the base, the general nature of which can be stated as including the steps of attaching a first repair tab to the lid and engaging a first replacement pin of the first repair tab into one of the holes of the base.

Still other objectives and advantages are obtained from the combination of the present invention including a broken media storage case and a repair kit, the general nature of which can be stated as including a media storage case initially including a base and a lid, the lid being pivotally mounted on the base, the base having a pair of side surfaces, the side surfaces each being formed with a hole, the lid having a top member, a pair of side members, and a pair of ears, the top member having a top surface, the side members extending substantially perpendicularly from the top member, the side members each having an inner surface and an outer surface, the ears extending from the side members, each ear having an inner surface that is substantially coplanar with the inner surface of the side member from which it extends, each ear including a pin protruding from the inner surface of the ear, the pin being pivotably received in one of the holes formed in the base, and at least a first repair tab, the at least first repair tab having at least a first attachment plate and a first replacement pin, the first replacement pin extending from the at least first attachment plate, the at least first attachment plate at least partially lying substantially flush against one of the top surface of the top member and the outer surface of one of the pair of side members, the at least first attachment plate being attached to the one of the top surface of the top member and the outer surface of the one of the pair of side members, the first replacement pin being pivotably received in one of the holes.

BRIEF DESCRIPTION OF THE DRAWINGS

A preferred embodiment of the invention, illustrative of the best mode in which applicant has contemplated applying the principles of the invention, is set forth in the following description and is shown in the drawings and is particularly and distinctly pointed out and set forth in the appended Claims.

FIG. 8 is a sectional view as taken along line 8—8 of FIG. 7; and

FIG. 9 is a sectional view as taken along line 9—9 of FIG. 7.

Similar numerals refer to similar parts throughout the drawings.

DESCRIPTION OF THE PREFERRED EMBODIMENT

Figure 1:
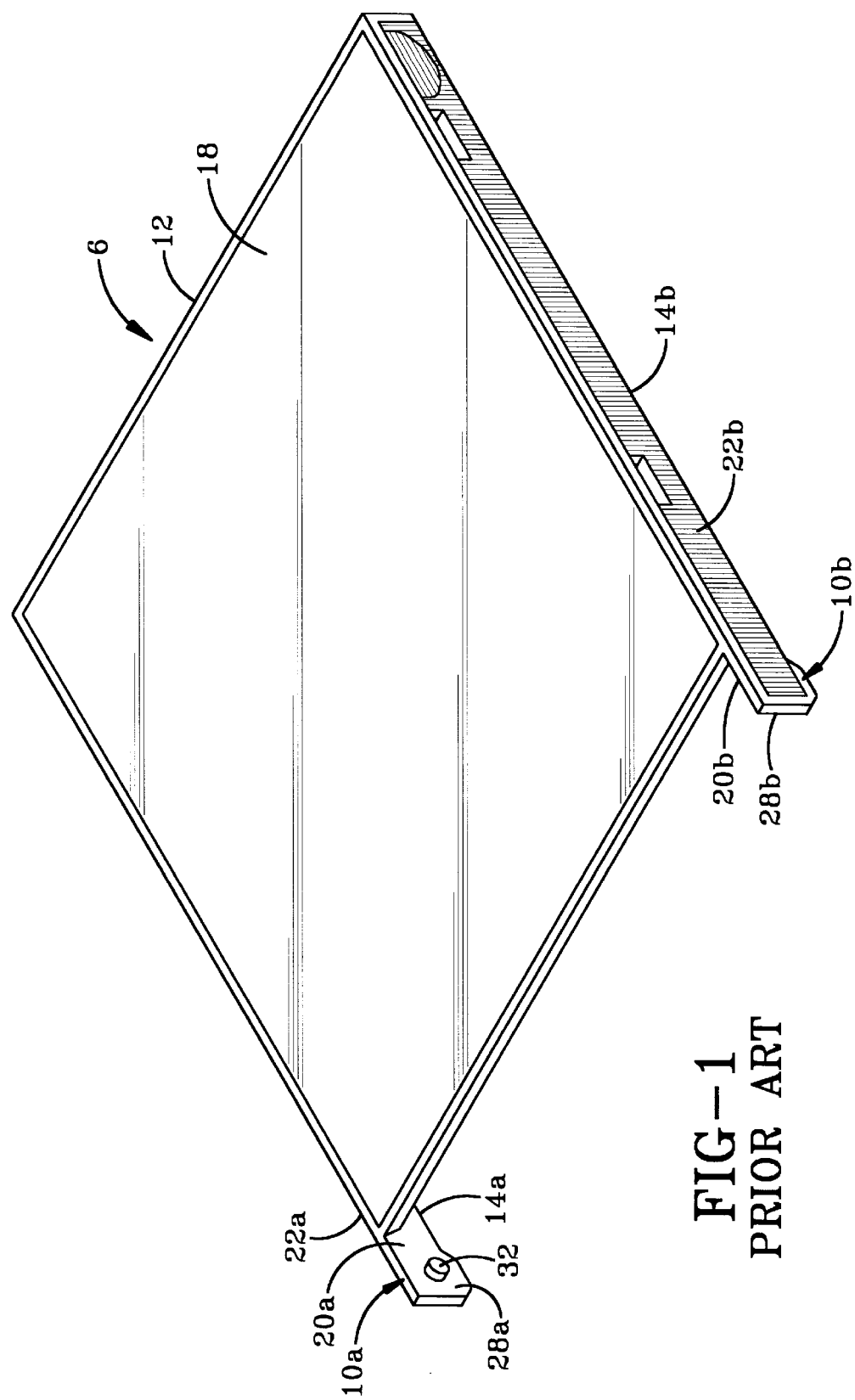
FIG. 1 is a perspective view of a lid of a prior art media storage case.

The repair kit of the present invention is indicated generally at the numeral 2 in the accompanying drawings. Repair kit 2 is intended for use in conjunction with a media storage case 4 of the type known and understood in the relevant art. Media storage case 4 is sometimes referred to as a "jewel case". Repair kit 2 permits repair of media storage case 4 in the event of breakage, as will be set forth more fully below.

As is understood in the relevant art, media storage case 4 includes a lid 6 and a base 8. Lid 6 is pivotably mounted on base 8. Lid 6 includes a first ear 10a and a second ear 10b that protrude outwardly therefrom and provide the structures for pivotably mounting lid 6 onto base 8, as will be set forth more fully below. First and second ears 10a and 10b are substantially mirror images of one another. During use of media storage case 4, one or both of first and second ears 10a and 10b can become broken away from lid 6, with such breakage substantially impairing the function of lid 6 and of media storage case 4.

As is understood in the relevant art, lid 6 includes a generally planar top 12, a first side member 14a, and a second side member 14b. Top 12 includes a generally planar top surface 18. First and second side members 14a and 14b are elongated, generally planar members that are substantially parallel and spaced apart from one another. First and second side members 14a and 14b are disposed at opposite sides of top 12 and extend perpendicularly therefrom in a direction generally opposite the direction faced by top surface 18. First side member 14a includes a first inner surface 20a that faces generally toward second side member 14b and a first outer surface 22a that faces generally away from second side member 14b. Likewise, second side member 14b includes a second inner surface 20b that faces generally toward first side member 14a and a second outer surface 22b that faces generally away from first side member 14a. First and second inner and outer surfaces 20a, 22a, 20b, and 22b are of a generally planar configuration.

As can be seen in FIG. 1, first and second ears 10a and 10b protrude outwardly from the ends of first and second side members 14a and 14b, respectively. First ear 10a includes a generally planar first ear inner surface 28a that is substantially coplanar with first inner surface 20a of first side member 14a. Likewise, second ear 10b includes a substantially planar second ear inner surface 28b that is substantially coplanar with second inner surface 20b of second side member 14b. First and second ear inner surfaces 28a and 28b are generally parallel and spaced apart.

Figure 2:
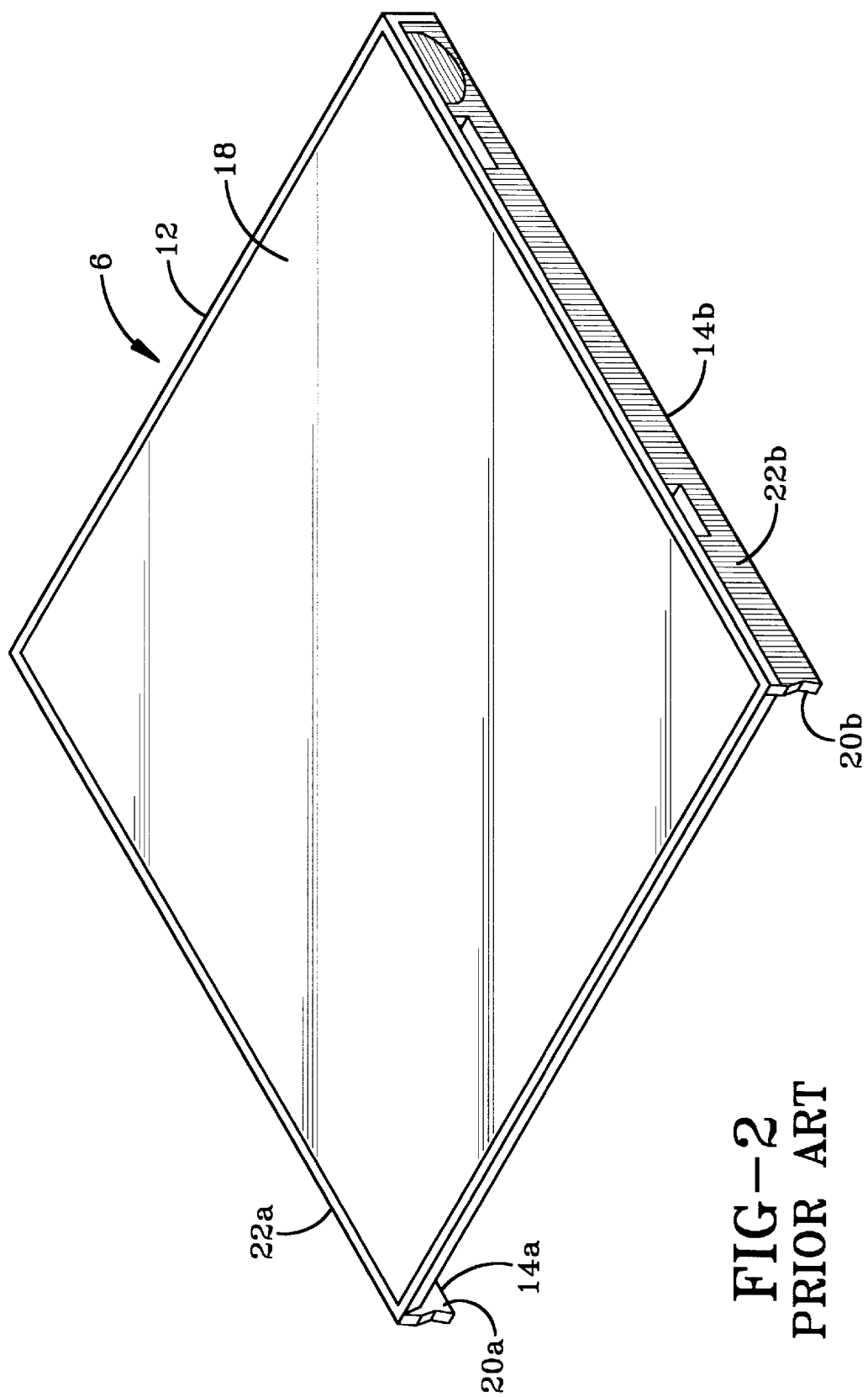
FIG. 2 is a view similar to FIG. 1, except with the ears broken away from the lid.

First and second ears 10a and 10b additionally each include a substantially cylindrical pin 32 protruding outwardly from first and second ear inner surfaces 28a and 28b, respectively. Pins 32 are axially aligned with one another such that they share a common imaginary central axis. As can be seen in FIG. 2, however, one or both of first and second ears 10a and 10b can become broken away from lid 6.

Figure 3:
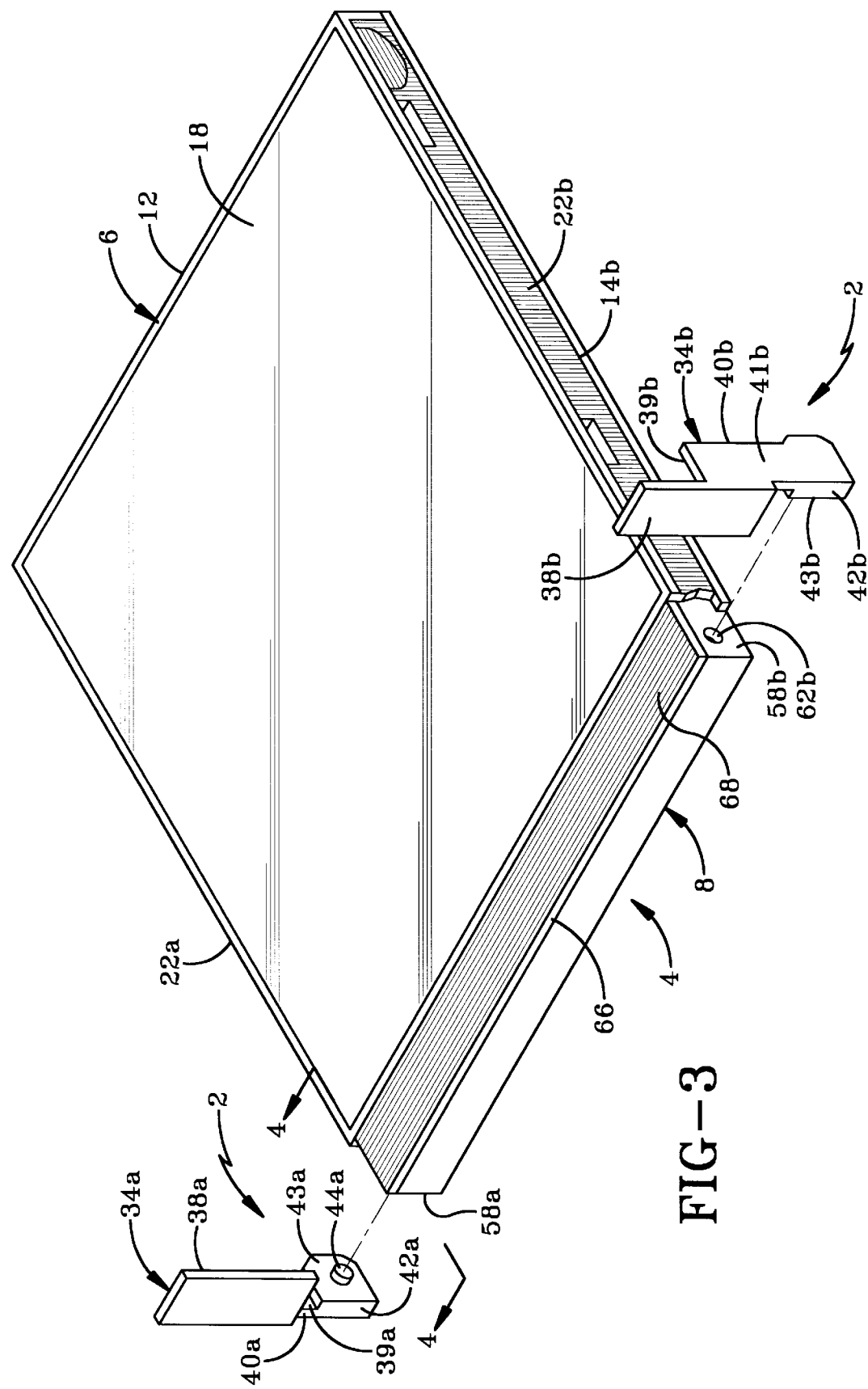
FIG. 3 is an exploded perspective view of the repair kit of the present invention prior to repairing the broken lid of the media storage case.

As can be seen in FIG. 3, repair kit 2 includes a first repair tab 34a and a second repair tab 34b that are substantial mirror images of one another. First repair tab 34a is intended to repair lid 6 in the absence of first ear 10a. Likewise, second repair tab 34b is intended to repair lid 6 in the absence of second ear 10b. Inasmuch as either or both of first and second ears 10a and 10b can be broken away from lid 6, either or both of first and second repair tabs 34a and 34b may be required to repair lid 6 depending upon the particular needs of the specific application.

Figure 4:
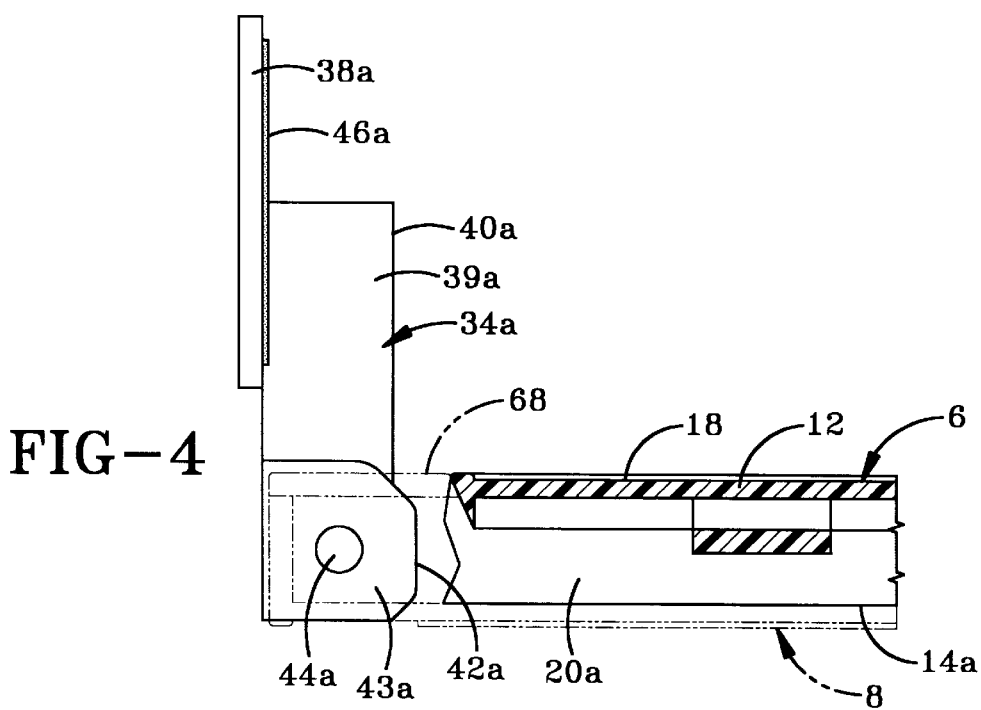
FIG. 4 is a view taken along line 4—4 of FIG. 3.
Figure 5:
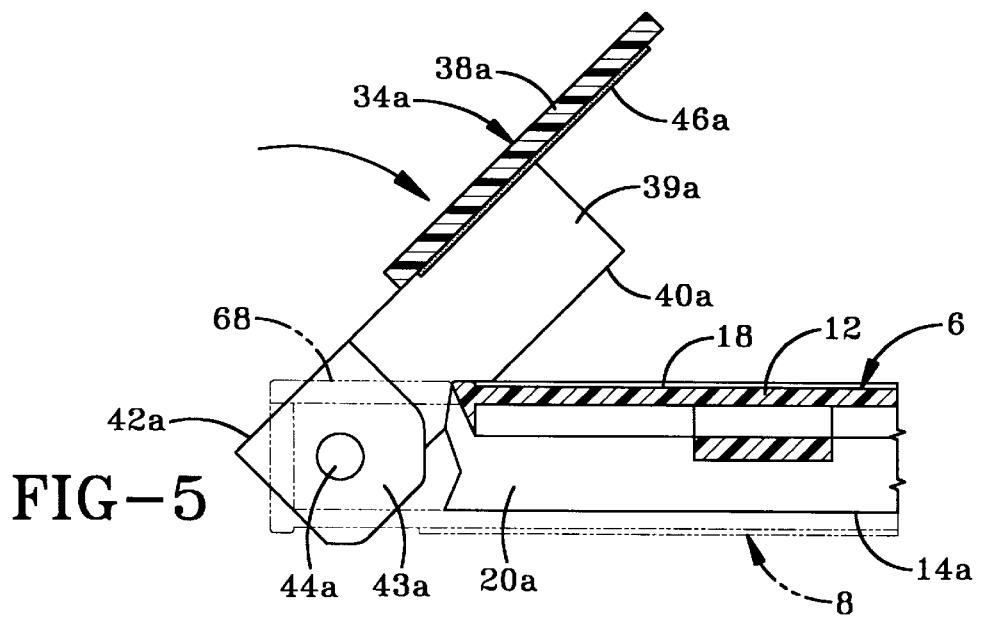
FIG. 5 is a view similar to FIG. 4, except showing the repair tab being rotated toward the top of the lid of the media storage case.
Figure 6:
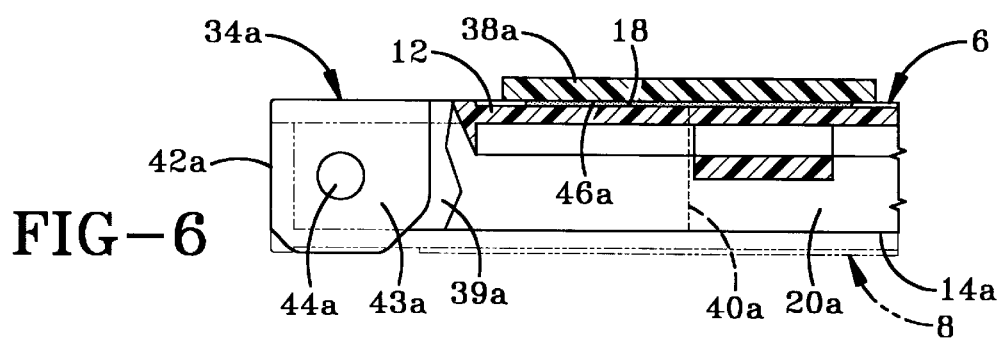
FIG. 6 is a view similar to FIG. 5, except showing the repair tab adhered to the top of the lid of the media storage case.
Figure 7:
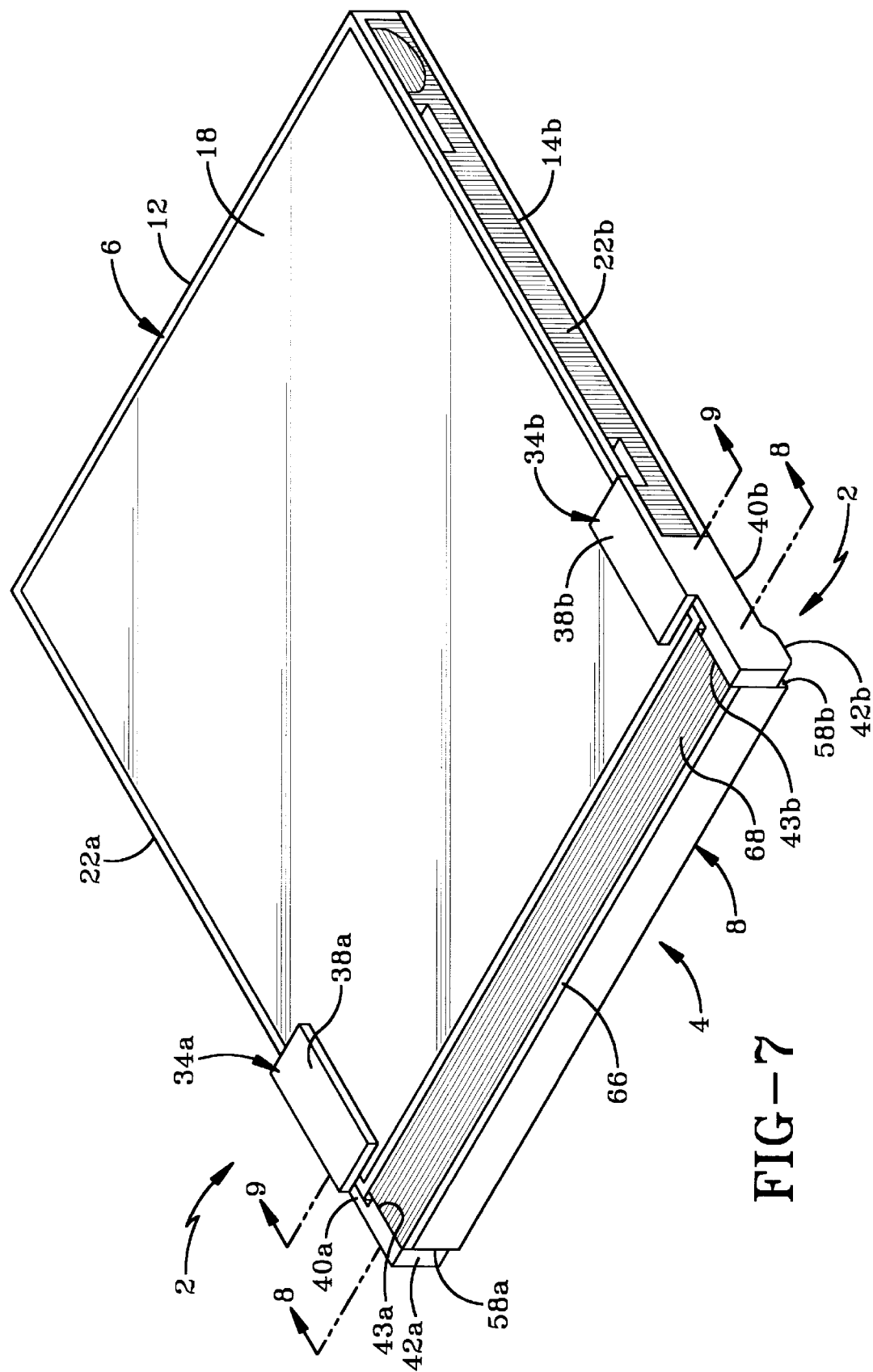
FIG. 7 is a perspective view of a broken lid of a media storage case that has been repaired by the repair kit of the present invention.

First and second repair tabs 34a and 34b each respectively include a top attachment plate 38a and 38b, a side attachment plate 40a and 40b, an abutment plate 42a and 42b, a replacement pin 44a and 44b, and an adhesive strip 46a and 46b (FIGS. 4–6). Inasmuch as first and second repair tabs 34a and 34b are substantial mirror images of one another, the configuration of first repair tab 34a will be discussed in detail, and it will be understood that second repair tab 34b is of substantially the same configuration but a mirror image thereof.

Top and side attachment plates 38a and 40a are elongated, generally planar members having a relatively low profile when compared with the widths and lengths thereof. Top and side attachment plates 38a and 40a are substantially perpendicularly connected with one another to form an elongated generally right-angle channel member. Side attachment plate 40a includes a generally planar inner plate surface 39a facing generally in the direction that top attachment plate 38a extends and a generally planar outer plate surface 41a facing generally away from top attachment plate 38a.

As is best shown in FIG. 3, abutment plate 42a is a substantially planar member from which replacement pin 44a protrudes. Abutment plate 42a extends from side attachment plate 40a. Abutment plate 42a is of a thicker cross section than side attachment plate 40a such that abutment plate 42a includes a generally planar abutment surface 43a that is generally parallel with and spaced from inner plate surface 39a for purposes to be set forth more fully below. The outer surface of abutment plate 42a that is opposed to abutment surface 43a is substantially coplanar with outer plate surface 41a.

Replacement pin 44a is a generally cylindrical member extending outwardly from abutment surface 43a of abutment plate 42a. It can be seen, therefore, that replacement pin 44a extends in a direction generally parallel with top attachment plate 38a.

Adhesive strip 46a is a quantity of self-adhesive material disposed on the lower surface of top attachment plate 38a that faces generally in the direction that side attachment plate 40a extends. Adhesive strip 46a can be any of the wide variety of materials such as double-sided adhesive tape with one side thereof adhered to top attachment plate 38a, a quantity of adhesive material applied directly to top attachment plate 38a, a flexible plastic foam pad having opposed adhesive-coated sides with one side thereof adhered to top attachment plate 38a, as well as a wide variety of other adhesive materials. Adhesive strip 46a preferably also includes a strip of release tape disposed on the outward-facing surface thereof to protect the adhesive surface thereof until needed for attachment of first repair tab 34a onto lid 6.

While adhesive strip 46a is depicted as being disposed on top attachment plate 38a, it is understood that adhesive strip 46a could alternatively or in addition thereto be disposed on inner plate surface 39a of side attachment plate 40a. It is likewise understood that adhesive strip 46a could be replaced by a quantity of other adhesive material that is supplied with repair kit 2 or is required to be supplied by the user without departing from the spirit of the present invention.

First and second repair tabs 34a and 34b are, with the exception of adhesive strips 46a and 46b, manufactured out of a lightweight, rigid, resilient material such as acrylonitrile butadiene styrene (ABS), polyvinyl chloride (PVC), or other plastic, although other materials may be used without departing from the spirit of the present invention. First and second repair tabs 34a and 34b are thus are thin-walled and strong and lightweight, yet are at least nominally flexible and at least moderately resistant to brittle fracture.

As is best shown in FIG. 3, base 8 of media storage case 4 includes a generally planar first side surface 58a and a generally planar second side surface 58b disposed at opposite sides of base 8 and generally parallel and spaced apart. First side surface 58a is formed with a substantially cylindrical first hole 62a at one end thereof. Likewise, second side surface 58b is formed with a substantially cylindrical second hole 62b that is axially aligned with first hole 62a. First and second holes 62a and 62b are sized to pivotably accommodate pins 32 and replacement pins 44a and 44b therein with only nominal clearance therebetween.

A cover 66 is preferably provided on base 8 near first and second holes 62a and 62b. Cover 66 includes a substantially planar cover surface 68 that is disposed slightly vertically higher than first and second side surfaces 58a and 58b such that top surface 18 of lid 6 is substantially coplanar with cover surface 68 when lid 6 is mounted in a closed position on base 8 (FIGS. 4–6).

When media storage case 4 is in its initial, unbroken condition, lid 6 is pivotally mounted on base 8. More specifically, pins 32 of first and second ears 10a and 10b are pivotally received in first and second holes 62a and 62b, respectively, such that first and second ears 10a and 10b, and thus lid 6, pivot about pins 32. In such condition, first and second ear inner surfaces 28a and 28b of first and second ears 10a and 10b, respectively, are slidingly disposed substantially flush against first and second side surfaces 58a and 58b of base 8. In this regard, it is understood that the pivoting of lid 6 with respect to base 8 results in the rotational sliding of first and second ear inner surfaces 28a and 28b along first and second side surfaces 58a and 58b. The substantially flush positioning of first and second ear inner surfaces 28a and 28b with respect to first and second side surfaces 58a and 58b prevents lid 6 from moving in a direction along the central axis of pins 32 with respect to base 8. First and second ear inner surfaces 28a and 28b thus retain pins 32 in pivotable engagement with first and second holes 62a and 62b and thus retains lid 6 in pivotable engagement with base 8.

As is understood in the relevant art, pins 32 are initially engaged in first and second holes 62a and 62b by nominally deflecting first and second ears 10a and 10b outwardly and away from one another to permit pins 32 to clear first and second side surfaces 58a and 58b. Upon alignment of pins 32 with first and second holes 62a and 62b, first and second ears 10a and 10b are released, thus pivotably engaging pins 32 in first and second holes 62a and 62b. In this regard, and as is generally understood in the relevant art, base 8 may be formed with a beveled surface formed in each of first and second side surfaces 58a and 58b adjacent first and second holes 62a and 62b, respectively, that deflect first and second ears 10a and 10b away from one another when pins 32 are slid along the beveled surfaces toward first and second holes 62a and 62b. Such beveled surfaces facilitate engagement of pins 32 in first and second holes 62a and 62b.

In the event that first ear 10a is broken away from lid 6 and second ear 10b remains intact thereon, first repair tab 34a is installed onto lid 6 by removing any release tape disposed on adhesive strip 46a and applying adhesive strip 46a onto top surface 18 such that inner plate surface 39a is substantially flush with first outer surface 22a of first side member 14a and replacement pin 44a is axially aligned with pin 32 of second ear 10b. In this regard, the alignment of replacement pin 44a with pin 32 of second ear 10b can be achieved by installing lid 6 onto base 8 such that pin 32 of second ear 10b is engaged in second hole 62b. Replacement pin 44a of first repair tab 34a is then engaged in first hole 62a with adhesive strip 46a angularly positioned away from and out of contact with top surface 18. First repair tab 34a can then be rotated about replacement pin 44a until inner plate surface 39a is oriented substantially flush with first outer surface 22a and adhesive strip 46a is adhesively engaged with top surface 18. Other methods are, of course, available for aligning inner plate surface 39a substantially flush with first outer surface 22a and axially aligning replacement pin 44a with pin 32 of second ear 10b. In the event that second ear 10b is broken away from lid 6 and first ear 10a remains intact thereon, second repair tab 34b is installed onto lid 6 to replace second ear 10b in a fashion similar to the installation of first repair tab 34a.

The aforementioned installation procedure can be substantially employed even in the event that both first and second ears 10a and 10b have been broken away from lid 6 such that neither of pins 32 can provide a reference point for aligning replacement pins 44a and 44b. In such event, lid 6 is aligned on base 8 in a closed position with top 12 disposed against cover 66 such that top surface 18 and cover surface 68 are substantially coplanar. First repair tab 34a is installed in the aforementioned fashion, thus fixing the position of lid 6 with respect to base 8. Second repair tab 34b is then installed in the above-described fashion to repair lid 6 and restore the function of media storage case 4.

The aforementioned installation procedure installs first and second repair tabs 34a and 34b onto lid 6 such that abutment surfaces 43a and 43b, respectively, are disposed substantially flush against first and second side surfaces 58a and 58b, respectively. As set forth hereinbefore, the flush configuration of first and second ear inner surfaces 28a and 28b against first and second side surfaces 58a and 58b serves to retain lid 6 in pivotable attachment on base 8. Similarly, abutment surfaces 43a and 43b retain the pivotable engagement of pins 32 and/or replacement pins 44a and/or 44b in first and second holes 62a and 62b when abutment surfaces 43a and 43b are disposed substantially flush against first and second side surfaces 58a and 58b. More specifically, the flush arrangement of abutment surfaces 43a and/or 43b against first and second side surfaces 58a and 58b, respectively, frictionally prevent lid 6 from moving in the direction along the central axis of first and second holes 62a and 62b with respect to base 8.

As can be seen in the accompanying figures, abutment plates 42a and 42b are thicker than side attachment plates 40a and 40b such that abutment surfaces 43a and 43b are built up or displaced from inner plate surfaces 39a and 39b, respectively. In this regard, it can be seen that abutment surfaces 43a and 43b are substantially parallel with and spaced apart from inner plate surfaces 39a and 39b, respectively. Such spacing corresponds with the thickness of first and second ears 10a and 10b which are of substantially the same thickness as first and second side members 14a and 14b. By spacing abutment surfaces 43a and 43b away from inner plate surfaces 39a and 39b, respectively, by the thickness of first and second ears 10a and 10b, first and second repair tabs 34a and 34b can be installed on lid 6 with inner plate surfaces 39a and 39b disposed substantially flush against first and second outer surfaces 22a and 22b of first and second side members 14a and 14b. In such position, abutment surfaces 43a and 43b are disposed substantially at the same positions previously occupied by first and second ear inner surfaces 28a and 28b, respectively. As such, abutment surfaces 43a and 43b are configured to be disposed substantially flush with first and second side surfaces 58a and 58b when first and second repair tabs 34a and 34b are installed onto lid 6 with inner plate surfaces 39a and 39b disposed substantially flush with first and second outer surfaces 22a and 22b.

Repair kit 2 thus provides replacement pins 44a and 44b to permit lid 6 to remain pivotably disposed on base 8 even after one or both of first and second ears 10a and 10b have been broken away from lid 6. Additionally, abutment surfaces 43a and 43b retain pins 32 and/or replacement pins 44a and/or 44b in pivotable engagement with first and second holes 62a and 62b by preventing movement of lid 6 in the axial direction, thus retaining lid 6 pivotably mounted on base 8. The relatively thin cross sections of first and second repair tabs 34a and 34b only nominally increases the outer dimensions of lid 6 when installed thereon such that media storage case 4 can still be used with many conventional storage racks.

Additionally, inasmuch as repair kit 2 restores the original functioning of lid 6, the benefits provided by lid 6 can be obtained despite breakage of either or both of first and second ears 10a and 10b from lid 6.

Accordingly, the improved media storage case repair kit is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved media storage case repair kit is construed and used, the characteristics of the construction, and the advantageous, new and useful results obtained; the new and useful structures, devices, elements, arrangements, parts and combinations, are set forth in the appended claims.

We claim:

1. A repair tab for replacing only an ear and a pivot pin projecting therefrom of a pivotally movable element of a media storage case, the repair tab comprising:
   a first attachment plate;
   a replacement pin extending from said first attachment plate; and
   an attaching device for fixedly attaching said first attachment plate on the movable element of the storage case.

2. The repair tab as set forth in claim 1, further comprising a first abutment plate attached to the first attachment plate, the replacement pin protruding from the first abutment plate.

3. The repair tab as set forth in claim 2, further compromising a second attachment plate, the second attachment plate connected with the first attachment plate.

4. The repair tab as set forth in Claim 3, wherein the attaching device comprises an adhesive strip, the adhesive strip being disposed on one of the first and second attachment plates.

5. A method of repairing a broken media storage case, the media storage case initially including a base and a lid, the lid being pivotally mounted on the base, the base having a pair of side surfaces, the side surfaces each being formed with a hole, the lid having a top member, a pair of side members, and a pair of ears, the top member having a top surface, the side members extending substantially perpendicularly from the top member, the side members each having an inner surface and an outer surface, the ears extending from the side members, each ear having an inner surface that is substantially coplanar with the inner surface of the side member from which it extends, each ear including a pin protruding from the inner surface of the ear, the pin being pivotably received in one of the holes formed in the base; at least one of said ears having been broken off, the method comprising the steps of:

attaching a first repair tab to the lid; and engaging a first replacement pin of the first repair tab into one of the holes of the base.

6. The method as set forth in claim 5, wherein the step of engaging a first replacement pin includes the step of abutting a first abutment surface against the side surface having the hole wherein the first replacement pin is engaged.

7. The method as set forth in claim 5, wherein the step of attaching a first repair tab includes the step of adhering a first attachment plate onto one of the top surface of the top member and the outer surface of one of the pair of side members.

8. The method as set forth in claim 5, further comprising the steps of attaching a second repair tab to the lid and engaging a second replacement pin of the second repair tab into the other hole.

9. The method as set forth in claim 8, wherein the step of engaging a second replacement pin includes the step of abutting a second abutment surface against the other side surface.

10. The method as set forth in claim 8, wherein the step of attaching a second repair tab includes the step of adhering a first attachment plate of the second repair tab onto one of the top surface of the top member and the outer surface of the other side member.

11. In combination, a broken media storage case and a repair kit, the combination comprising:

a media storage case initially including a base and a lid, the lid being pivotally mounted on the base, the base having a pair of side surfaces, the side surfaces each being formed with a hole, the lid having a top member, a pair of side members, and a pair of ears, the top member having a top surface, the side members extending substantially perpendicularly from the top member, the side members each having an inner surface and an outer surface, the ears extending from the side members, each ear having an inner surface that is substantially coplanar with the inner surface of the side member from which it extends, each ear including a pin protruding from the inner surface of the ear, the pin being pivotably received in one of the holes formed in the base; at least one of the said ears having been broken off; and a first repair tab, the first repair tab having a first attachment plate and a first replacement pin, the first replacement pin extending from the first attachment plate, the first attachment plate at least partially lying substantially flush against one of the top surface of the top member and outer surface of one of the pair of side members, the first attachment plate being attached to the one of the top surface of the top member and the outer surface of the one of the pair of side members, the first replacement pin being pivotably received in one of the holes.

12. The combination as set forth in claim 11, further comprising a first abutment plate attached to the first attachment plate, the first replacement pin protruding from the first abutment plate, the first abutment plate being disposed substantially flush with the side surface having the hole wherein the first replacement pin is pivotably received.

13. The combination as set forth in claim 12, wherein the first abutment plate is oriented substantially coplanar with the inner surface of one of the side members.

14. The combination as set forth in claim 12, further comprising a second attachment plate, the second attachment plate connected with the first attachment plate, the second attachment plate at least partially being disposed substantially flush with the other of the top surface of the top member and the outer surface of the one of the pair of side members, one of the first and second attachment plates being attached onto the one of the top surface of the top member and the outer surface of the one of the pair of side members against which the one of the first and second attachment plates is disposed flush.

15. The combination as set forth in claim 11, further comprising an adhesive strip disposed on the first attachment plate, the adhesive strip attaching the first attachment plate onto the one of the top surface of the top member and the outer surface of the one of the pair of side members.

16. The combination as set forth in claim 11, further comprising a second repair tab, the second repair tab having a first attachment plate and a second replacement pin, the second replacement pin extending from the first attachment plate of the second repair tab, the first attachment plate of the second repair tab at least partially being disposed substantially flush against one of the top surface of the top member and the outer surface of the other side member, the first attachment plate of the second repair tab being attached onto the one of the top surface of the top member and the outer surface of the other side member, the second replacement pin being pivotably received in the other of the holes.

17. The combination as set forth in claim 16, further comprising a second abutment plate attached to the first attachment plate of the second repair tab, the second replacement pin protruding from the second abutment plate, the second abutment plate being disposed substantially flush with the side surface having the hole wherein the second replacement pin is received.

18. The combination as set forth in claim 17, wherein the second repair tab further includes a second attachment plate, the second attachment plate of the second repair tab connected with the first attachment plate of the second repair tab, the second attachment plate at least partially being disposed substantially flush with the other of the top surface of the top member and the outer surface of the other side member, one of the first and second attachment plates of the second repair tab being attached onto the one of the top surface of the top member and the outer surface of the other side member against which the one of the first and second attachment plates of the second repair tab is disposed flush.

19. The combination as set forth in claim 17, wherein the second abutment plate is oriented substantially coplanar with the inner surface of the other side member.

20. The combination as set forth in claim 16, further comprising an adhesive strip disposed on the first attachment plate of the second repair tab, the adhesive strip attaching the first attachment plate of the second repair tab onto the one of the top surface of the top member and the outer surface of the other side member.

21. A repair tab for replacing an ear and pivot pin of a pivotally movable element of a media storage case, said pivotally movable element having side surfaces and an upper surface, said repair tab comprising:

an ear having a first surface;

a pivot pin extending outwardly from said first surface;

an adhesive applied to said first surface to secure the ear to the side surface of the pivotally movable element.

22. A repair tab as set forth in claim 21, wherein said pivot pin extends outwardly substantially perpendicular to the first surface of the ear.

23. A repair tab as set forth in claim 21, wherein said ear further comprises:

a second surface disposed substantially at right angles to said first surface;

said first surface being disposed to contact the side surfaces of the pivotally movable element and the second surface being disposed to contact the upper surface of the pivotally movable element.

24. A repair tab as set forth in claim 23, further comprising:

an adhesive applied to the second surface of the repair tab.

* * * * *